T. J. THORP.
FARM AUTOMOBILE.
APPLICATION FILED JUNE 4, 1910.

988,287.

Patented Mar. 28, 1911.
10 SHEETS—SHEET 6.

Witnesses:
M. J. Kilroy

Inventor:
Thomas J. Thorp
By Dunlap Sheridan, Wilkinson, Scott & Richmond Att'ys

T. J. THORP.
FARM AUTOMOBILE.
APPLICATION FILED JUNE 4, 1910.

988,287.

Patented Mar. 28, 1911.
10 SHEETS—SHEET 9.

Witnesses:
M. J. Kilroy
C. C. Dunlap

Inventor:
Thomas J. Thorp
By Sheridan, Wilkinson, Scott & Richmond Att'ys

T. J. THORP.
FARM AUTOMOBILE.
APPLICATION FILED JUNE 4, 1910.

988,287.

Patented Mar. 28, 1911.
10 SHEETS—SHEET 10.

Witnesses:
M. J. Kilroy
A. L. Walton

Inventor:
Thomas J. Thorp
By Sheridan, Wilkinson, Scott & Richmond
Attys

UNITED STATES PATENT OFFICE.

THOMAS J. THORP, OF LOS ANGELES, CALIFORNIA.

FARM-AUTOMOBILE.

988,287. Specification of Letters Patent. Patented Mar. 28, 1911.

Application filed June 4, 1910. Serial No. 565,059.

*To all whom it may concern:*

Be it known that I, THOMAS J. THORP, a citizen of the United States, residing at Los Angeles, in the county of Los Angeles and State of California, have invented certain new and useful Improvements in Farm-Automobiles, of which the following is a specification.

My invention relates to motor vehicles which are particularly adapted to agricultural uses.

My object has been to provide a motor vehicle which can be adapted to the various uses to which agriculturalists desire to put them.

I have endeavored to so design my invention that it may be used as a vehicle for passengers or may be quickly converted into a motor for general traction purposes. It may also be converted into a dray for carrying merchandise.

A further and important object of my invention is to make the frame thereof very flexible in order to enable it to easily operate upon very rough ground. While I have designed it with the purpose of making it extremely flexible yet I have endeavored to retain the utmost simplicity of construction.

I have also endeavored to make the construction very durable and efficient for the various purposes to which it is applied.

A further object of my invention has been to render the structure adaptable to the traction of a variety of agricultural implements. I have also provided means whereby a variety, as well as a considerable number of these implements may be carried upon the frame of the vehicle simultaneously.

A further object of my invention has been to render the invention as a whole largely automatic in its character, and to adapt it to the control of a single operator. This operator will control the motor, the steering mechanism, the farm implements, and other parts of the mechanism.

The above objects and advantages of my improvements, as well as others, will be rendered more apparent in the following specification taken in connection with the accompanying drawings, in which:—

Similar numerals of reference are applied to similar parts in the different views.

In order to make the following description more easily comprehended it is considered advisable to confine the earlier part of the description to the general arrangement of the more important elements of the framework and the general arrangement of the motor, the drive wheels, &c.

The vehicle as a whole may be conveniently considered as being divided into two very general or elementary groups. Of these the circular and horizontally disposed member 50, to which is integrally attached the rectangular portion 55, and to which is also pivotally attached the rearwardly extending pivoted members 52, may be said to form the basis of one of said groups. The other group comprises a secondary polygonal framework 51 which is designed to rotate in a horizontal direction within the circular frame 50. This polygonal frame 51 supports the outer frame 50 through means of certain rollers which will be described later. This interior polygonal frame serves as a means for supporting and carrying the motor, the steering mechanism, and all of the mechanism directly associated with the motive power and control of the machine. The drive wheels 115 are mounted in bearings carried by this interior polygonal frame. The operator who manages the machine is provided with a seat upon this interior frame, and the cab is mounted upon this frame. This interior polygonal frame is adapted to rotate in a horizontal direction within and with relation to the outer frame 50; or primary frame.

Referring again to the outer frame, the circular member 50 is provided with outwardly and rearwardly formed members 50$^a$, which are fixed to the frame 50 and between which and the said circular frame the front ends of the rearwardly extending frame members 52 are inserted. A bolt or pin 53 is put through the members 50$^a$, and the ends of said bolts 53 are threaded into the frame 50 as shown at 50$^b$, Fig. 7. The rectangular portion, comprising the bars 54 and 55, is preferably welded to the circular frame 50 at the points 54$^a$ and 54$^b$.

The bars 54 carry upright yokes or guides 56 for the pivoted frame members 52. These upright guides 56 are provided with cover plates 57 which confine the bars 52 within the said yoke. The yoke is also provided with lugs 58, which lap over the bars 54 and screws 58$^a$ in the said yokes 56 hold them in place. By this means the bars 52 may have a very extended movement in a vertical direction while the wheels of the vehicle are moving over rough ground, and in this respect a very important flexible feature in the framework is provided at this point.

The rearwardly extending pivoted members 52 are forked as shown at 59 and 59$^a$, and between the two parts 59 and 59$^a$ are placed the vehicle wheels 60. Each of these wheels is preferably provided with a spring 61 loosely attached to the members 52 at 62. In place of springs at this point it may be found preferable in some cases to attach the axle bearings 60$^a$ rigidly to the members 52. In either case the wheels may be adjustably attached to said members 52 by means of pins 62$^a$ which pass through the parts 62 and through apertures 62$^b$.

Figures 5, 18, 19, 20:
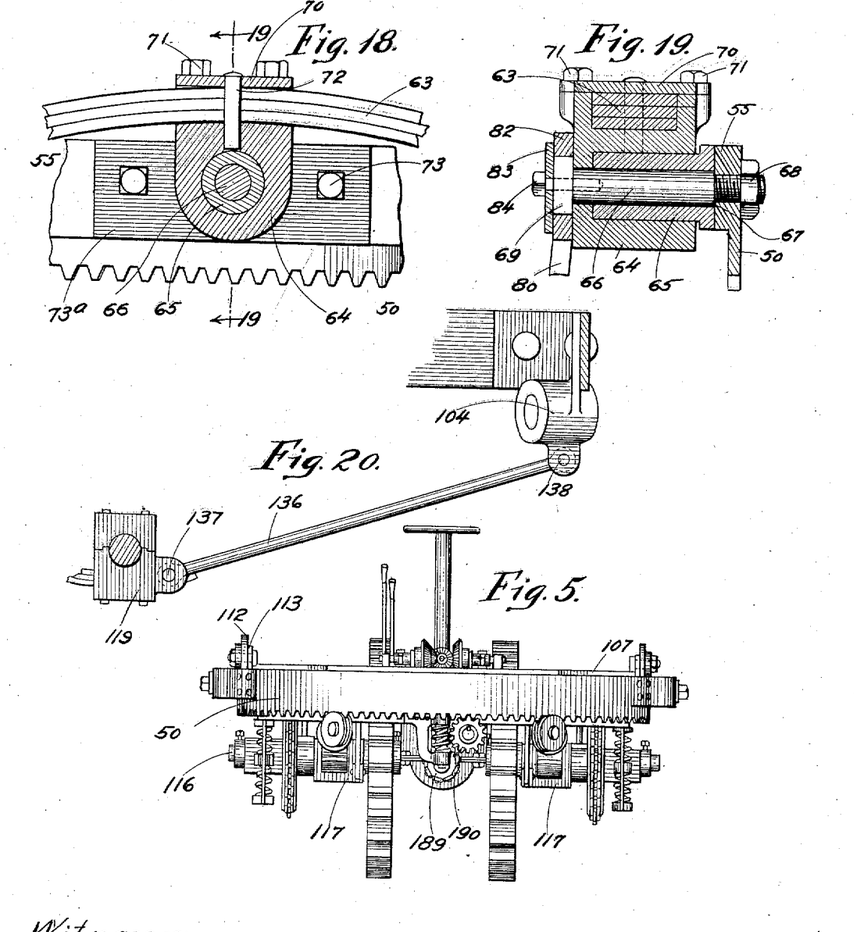
Fig. 5 is a front elevation of the driving portion of the machine.
Fig. 18 is an enlarged detail showing portions of the connections with the transverse semi-elliptic spring in section.
Fig. 19 is a sectional view, taken on the line 19—19 of Fig. 18.
Fig. 20 is a detail view showing the push rod, connecting the turntable with one of the axles.
Figure 6:
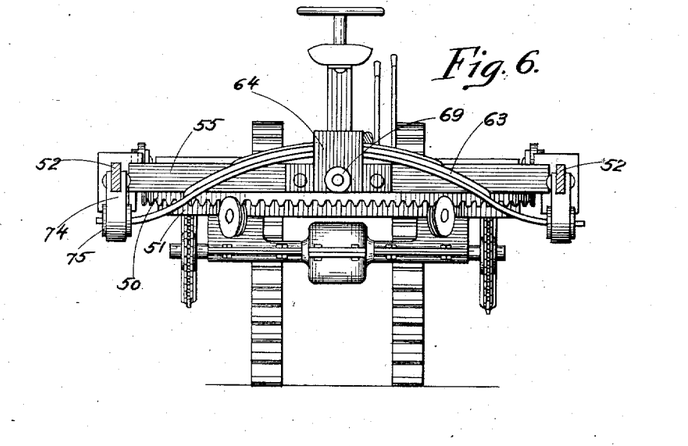
Fig. 6 is a cross section of the machine, looking forward, and showing more particularly the transverse spring and its connection with the framework.

The rectangular portion 55 of the outer frame is connected to the rearwardly extended members 52 by means of leaf springs 63, Figs. 6, 18, 19. These leaf springs 63 are attached to a block 64 which is pivotally attached to the frame member 55 by means of a sleeve 65. This sleeve 65 is secured to the frame member 55 by means of bolts or rivets 73, which are passed through flanges 73$^a$ which project laterally from the body of the said sleeve.

The block 64 is held in place on the sleeve 65 by means of the bolt 66 which is shouldered against the frame member 55 at 67 and which is finally secured in place by the nut 68. This bolt has a circular head 69 which bears upon the outer face of the block 64 and serves as means of support for certain other portions of the framework which will be described later.

Figures 8, 14, 15, 16, 17, 24:
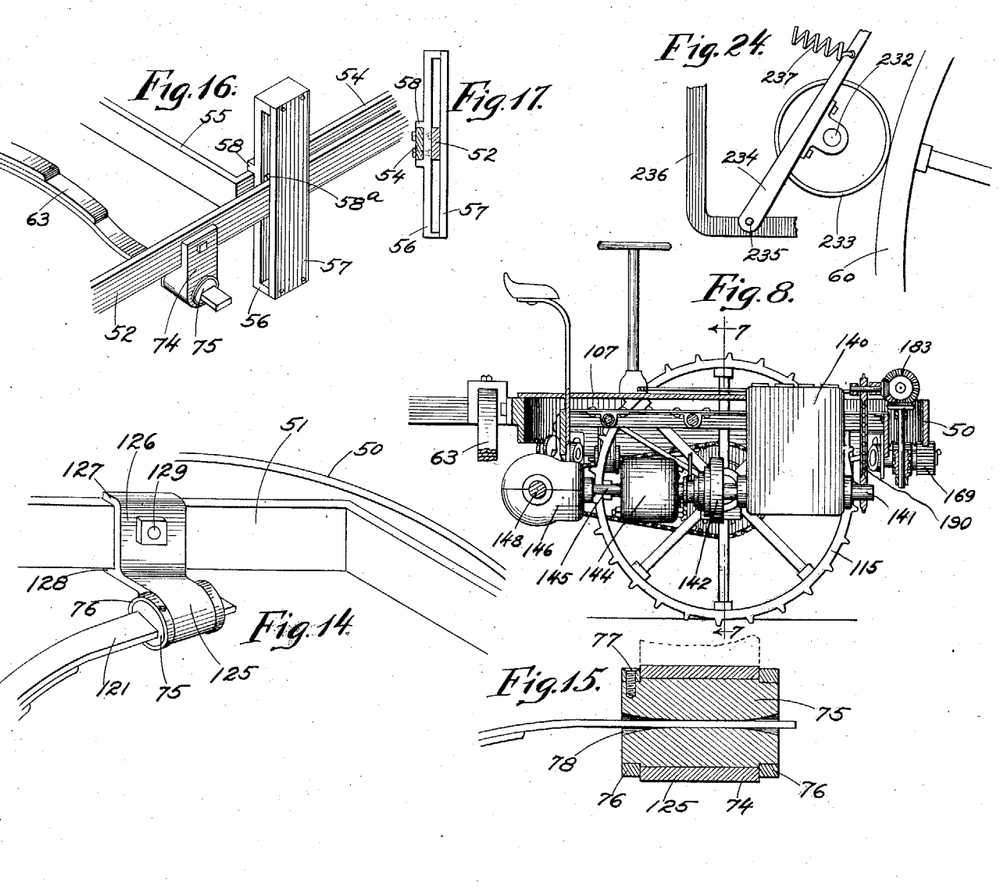
Fig. 8 is a longitudinal section substantially along the center line of the machine, with portions shown in elevation.
Fig. 14 is a perspective view of the slidable and rotatable connections of the semi-elliptic spring with the turntable.
Fig. 15 is a sectional view of the sleeve through which the end of the spring passes, and related parts.
Fig. 16 is a perspective view showing a vertical guide for the rearwardly extending portions of the framework which carry one of the rear wheels. and also showing the slidable and rotatable connections of the transverse semi-elliptical spring with said rearwardly extending framework.
Fig. 17 is a cross section of the framework, showing the mode of attachment of the vertical guides.
Fig. 24 is a detail view of the friction roller for operating the elevating mechanism of the implement frame.

The spring 63 is held in position in the block 64 by means of the cover plate 70 which is held in place by the screws 71. The pin 72 which is inserted in the hole in the spring holds it in place. The outer extremities of the spring 63 are slidably mounted in blocks or chairs 74 which are fixed to the rearwardly extending members 52. These chairs have a cylindrical bore in which is fitted a cylindrical member 75 (Figs. 15, 16) and which in turn is provided with a rectangular slot 78 passing longitudinally through said member 75. Into this slot is inserted the end of the spring 63. This construction is more fully illustrated in the sectional view appearing in Fig. 15. The cylindrical member 75 is provided with reduced portions at the ends, to which are fitted the sleeves 76 and which are secured in position by screws 77. By this means the cylindrical member 75 is held in place within the chair or block 74. A similar block or chair is used in other parts of the vehicle and is there given the reference numeral 125. By means of this spring mounting the ends of the springs 63 are permitted to have what may be called a universal movement. It will be seen that the end of the spring may slide longitudinally in the slot 78 in the cylindrical member 75 and the cylindrical member 75 is free to rotate within the block or chair 75. By this means, I provide another very flexible feature in my improved construction at this point.

Between the rearwardly extending members 52, I provide a carrying framework 79, preferably of rectangular form and lying in a horizontal position. This carrying frame 79 is adapted to receive and support a variety of vehicle bodies or elements and also the frames of a variety of agricultural implements which may be removably attached to said carrying frame 79. This carrying frame is supported at its front end by links 80, which are secured thereto by pins or bolts 81. These links are inclined upwardly and inwardly and are pivotally attached to the head 69 of the bolt 66. These links 80 may form a single piece, as shown in the drawings, or they may be separate pieces, both of which at their upper ends are supported by the said bolt head 69. The upper end 82 of these links is held in position on the head 69 of the bolts 66 by means of a washer or disk 83, which is secured in position on the bolt head by the screw 84. The rear end of the carrying frame 79 is supported by a spring 85 which is slidably mounted at its ends in rotatable members 75, which are in turn fitted to chairs 86. These chairs are secured to the rear ends of the forked portions 59 and 59ᵃ of the members 52 and serve to space and secure said forks together at their rear ends, as well as to serve as a support for the ends of the spring. The spring 85 is secured by rivets or bolts or other suitable means 87 to the center of a transverse portion 79ᵃ of the carrying frame 79.

Figure 2:
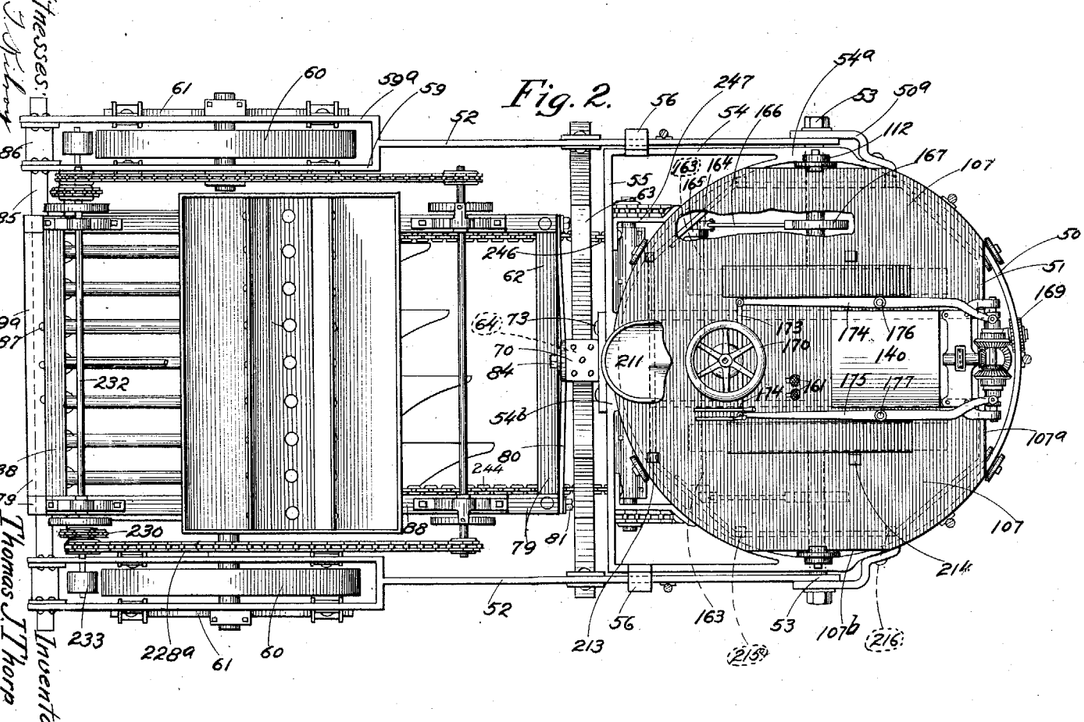
Fig. 2 is a plan view of the machine with the greater part of the propelling or driving mechanism covered with a platform, and showing more particularly the greater part of the steering mechanism. In this view the seed drill and other farm implements are shown in place.
Figure 3:
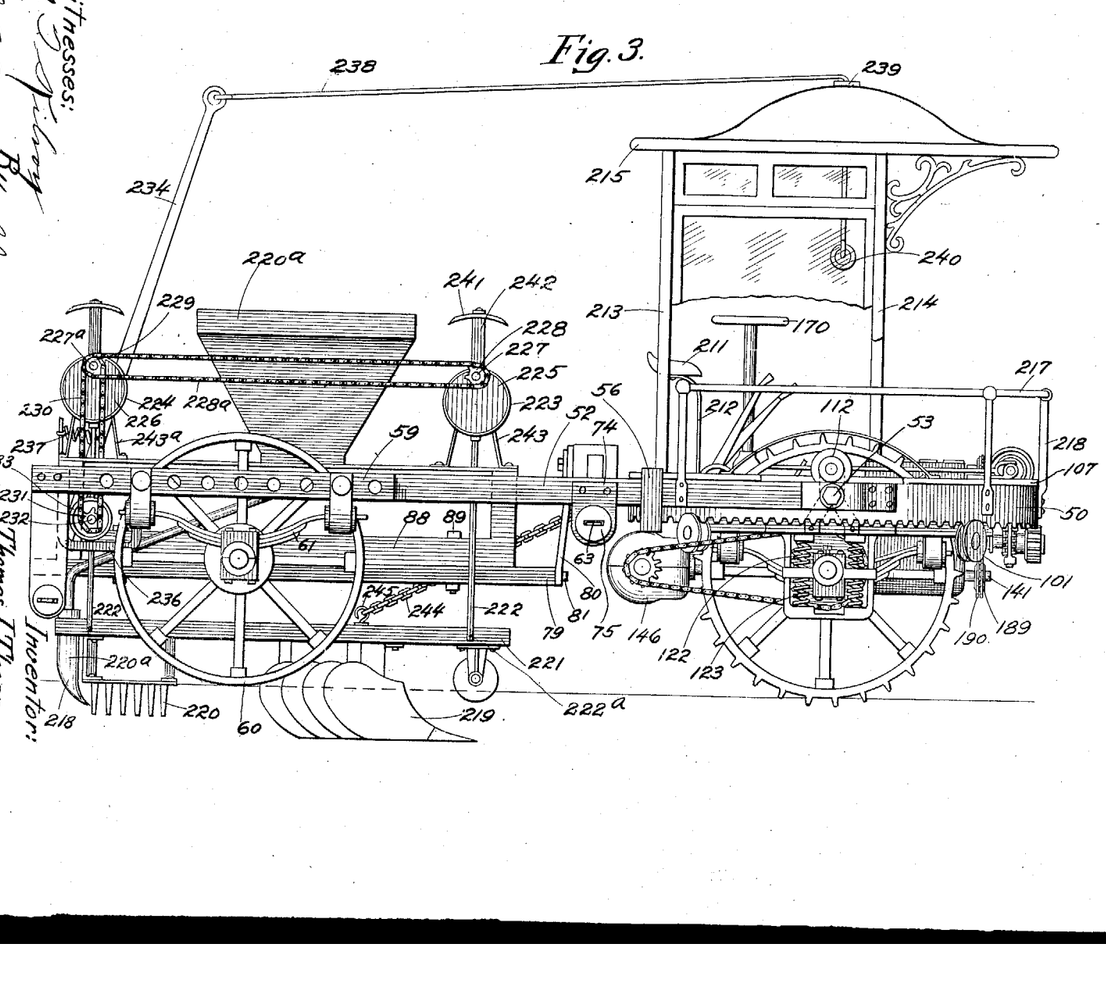
Fig. 3 is an elevation of the machine showing the farm implements attached.

In Figs. 2 and 3 I have shown certain agricultural implements supported by the carrying frame 79, whose frame 88 is removably secured to the carrying frame 79 by the bolts 89. The agricultural equipment shown in Figs. 2 and 3 comprises a seed-drill 218, a series of plows 219, and a harrow 220, which will be referred to later.

Figure 4:
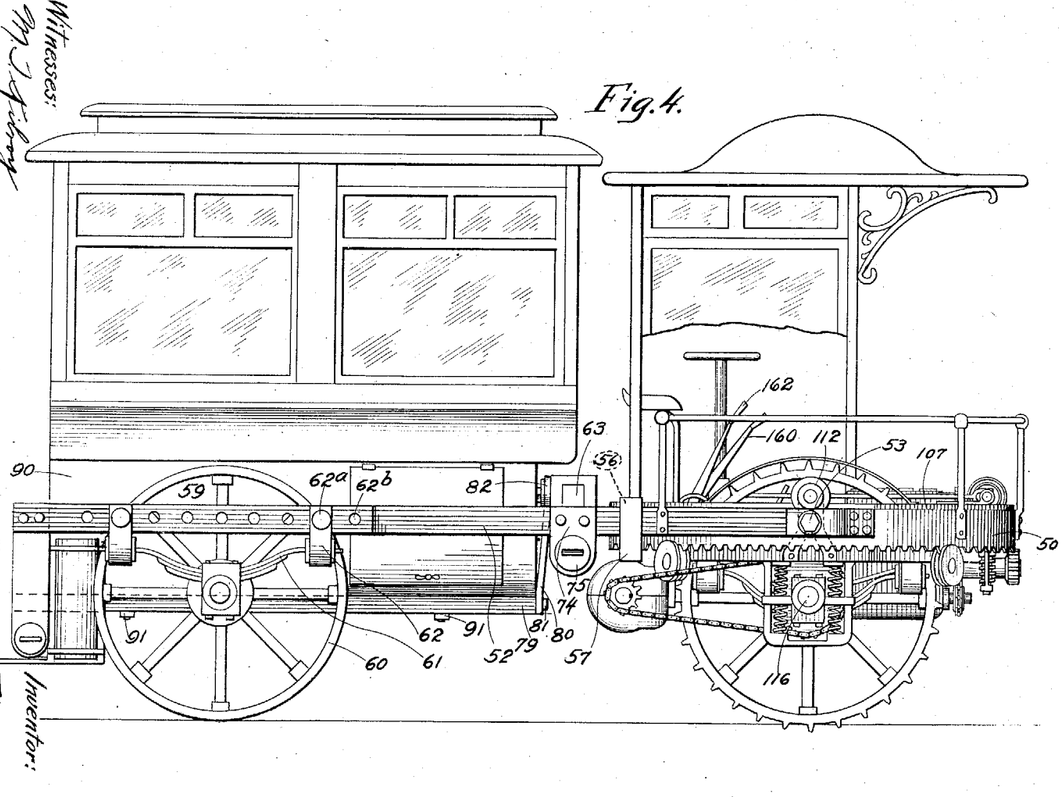
Fig. 4 is a side elevation showing the machine applied to a vehicle for passengers.

In Fig. 4 I have illustrated my invention with the body of the covered coach or carriage 90 mounted upon the carrying frame 79 and removably secured thereto by the bolts 91.

Figure 1:
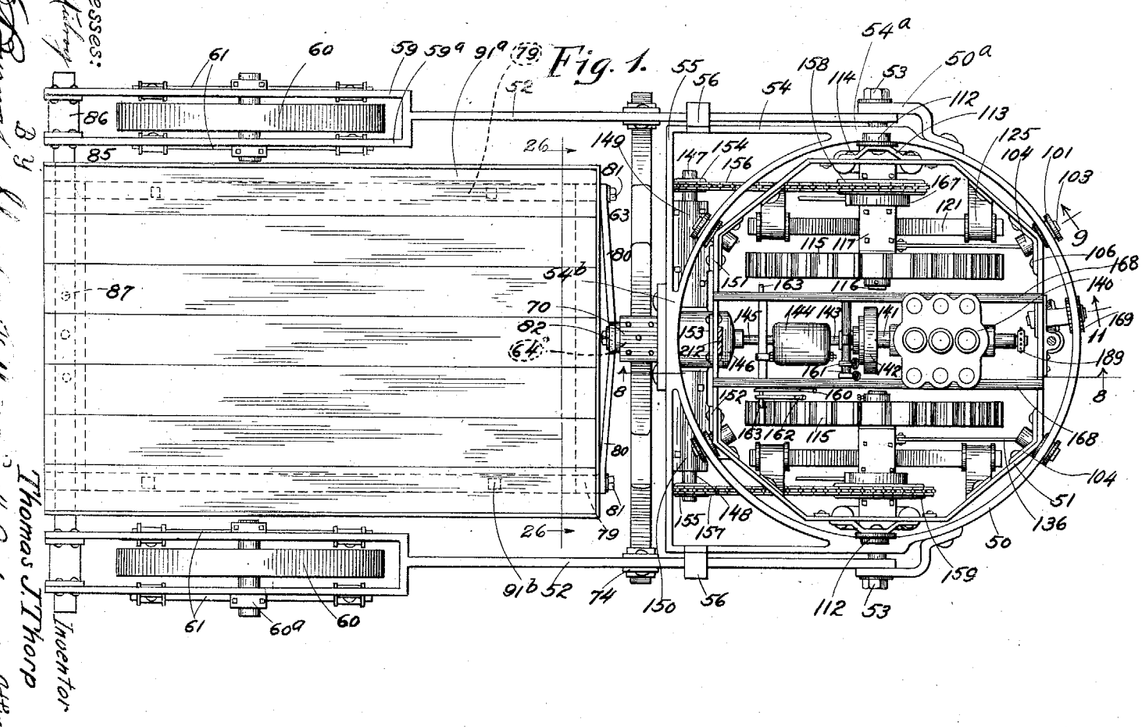
Figure 1 is a plan view of the machine, showing the greater part of the mechanism of the propelling end, and showing the rear end provided with a plain box or body.

In Fig. 1 I have shown a plain box or body 91ᵃ suitable for carrying ordinary merchandise and for the general purposes of a dray. This body 91ᵃ may be in a similar manner removably attached to the carrying frame 79 by the bolts 91ᵇ. Any other suitable means for attaching these various elements or implement frames to the carrying frame 79 may be used. I have illustrated ordinary bolts for this purpose, as they seem to be the simplest means at hand. It will be seen that this carrying frame is supported by the main frame in a manner which renders the whole structure extremely flexible, and by this means the vehicle as a whole is still further adapted for use on very rough ground and for work of a very diversified character.

The polygonal frame 51, as previously mentioned, supports the forward end of the vehicle framework and all of the driving and steering mechanism. This polygonal frame 51 is provided with four rollers 101 which bear upon the lower edge of the circular portion 50 of the outer frame. These rollers 101 are provided with gear teeth 102, which mesh with gear teeth 100 which are formed upon the lower edge of the circular frame 50. The said rollers are provided with flanges 101ᵃ, which overlap the frame 50 and hold the said frame 50 in place. These rollers are supported by pins or bolts 103, to which they are rotatably fitted and which are threaded into the hanger 104. This hanger 104 is provided with flanges 105, which are secured to the polygonal frame 51 by the rivets 106. The polygonal frame 51 supports a platform 107, which is secured to it by angle piece 108 and rivets 109.

Figure 9:
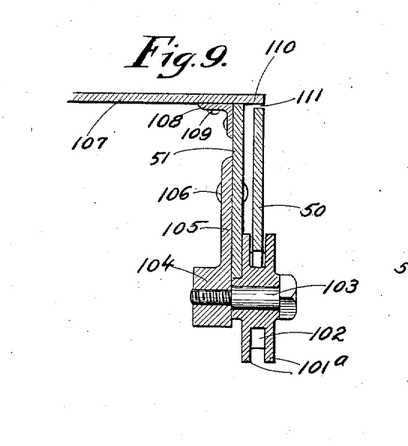
Fig. 9 is a sectional view taken on the line 9 of Fig. 1, and showing the supporting roller for the framework.
Figure 10:
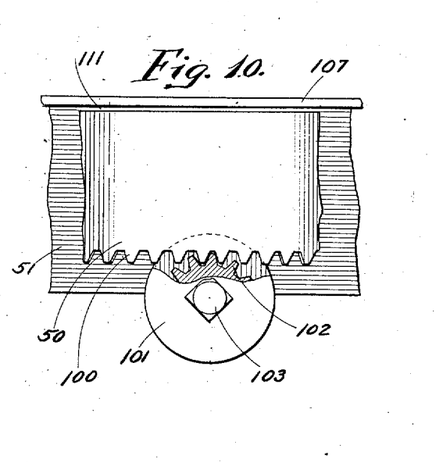
Fig. 10 is an elevation of said roller, partly in section.
Figure 11:
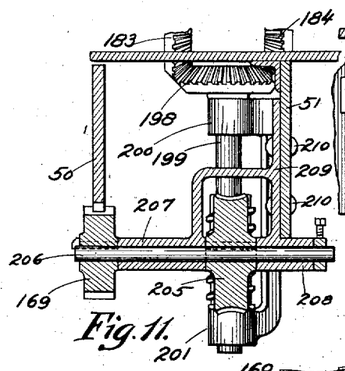
Fig. 11 is a sectional view on the line 11 of Fig. 1, showing a portion of the steering mechanism.
Figure 12:
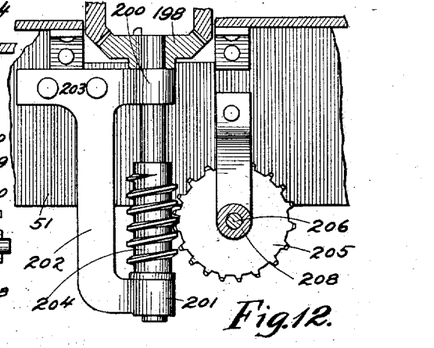
Fig. 12 is an elevation partly in section, as viewed from the front of the machine, of the worm gearing of said steering mechanism.
Figure 13:
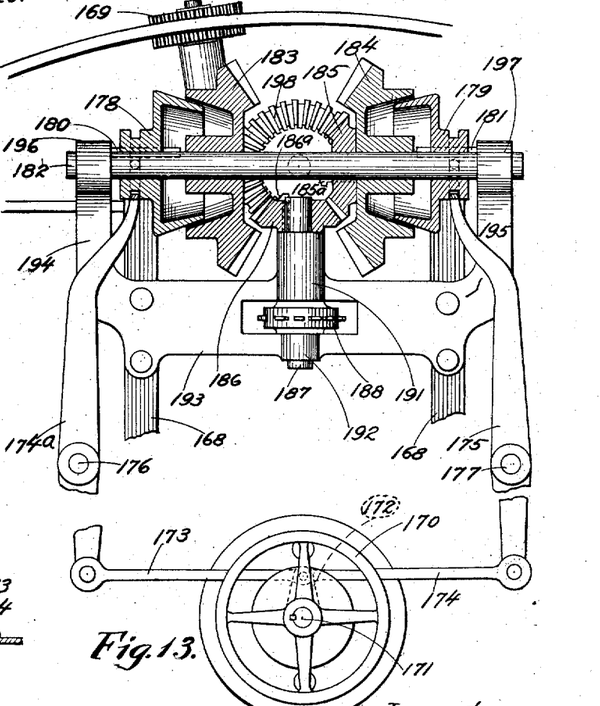
Fig. 13 is a plan view, with portions in sections, of the greater part of said steering mechanism, showing particularly the clutches and beveled gear connections.
Figure 21:
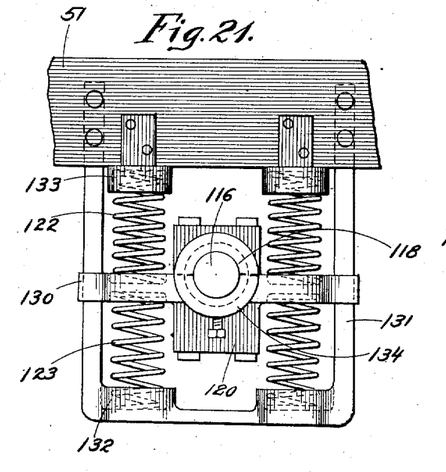
Fig. 21 is a detail showing the outer springs.
Figure 22:
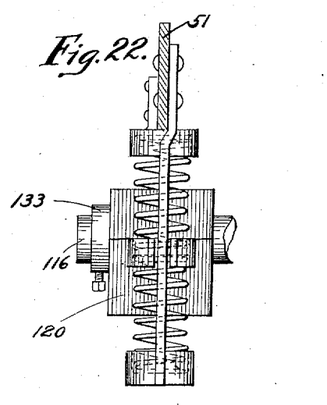
Fig. 22 is a view at right angles to Fig. 21.
Figure 23:
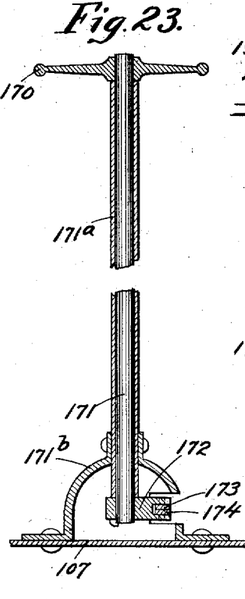
Fig. 23 is a sectional view of the steering wheel.
Figure 25:
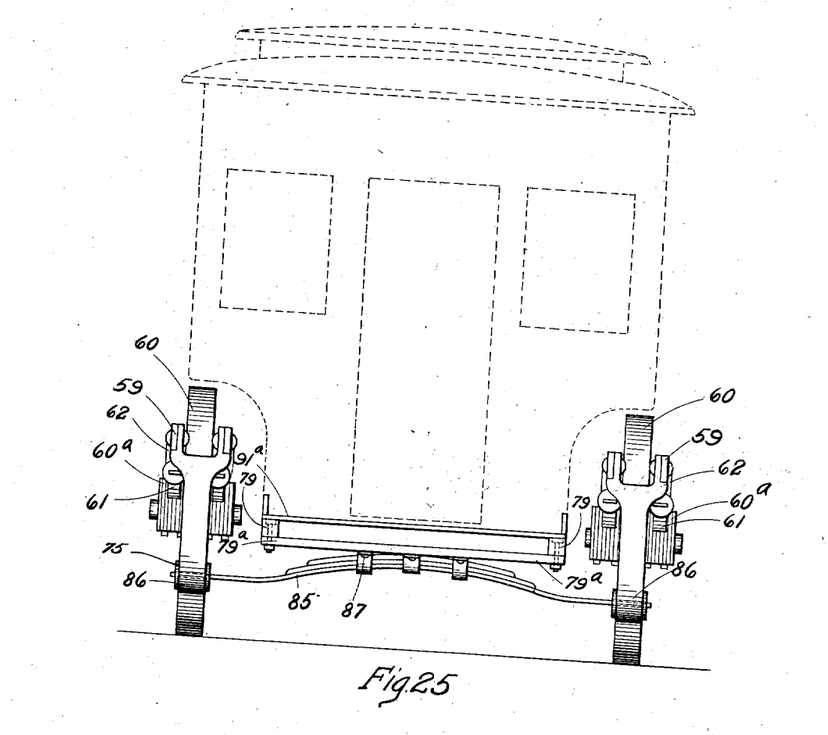
Fig. 25 is an elevation of the rear end of the vehicle when used as a dray, a bus, or carriage body being shown in dotted lines.
Figure 26:
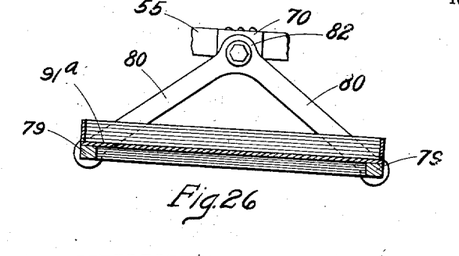
Fig. 26 is a section just behind the suspending links substantially on the line 26—26 of Fig. 1.

The platform 107 is preferably circular in its general form and projects outwardly beyond the limits of the polygonal frame 51 and overlaps the circular frame 50, but does not rest upon the same or come in contact therewith at any point. Portions of this platform are cut away, as shown at 107ᵃ and 107ᵇ, to permit the attachment of certain portions of the mechanism. The portions of the platform that project beyond the polygonal frame 51 are given a reference numeral 110, as shown more particularly in Fig. 9. A small space is provided between the projecting part 110 and the upper edge of the circular frame 50, as shown at 111.

Figure 7:
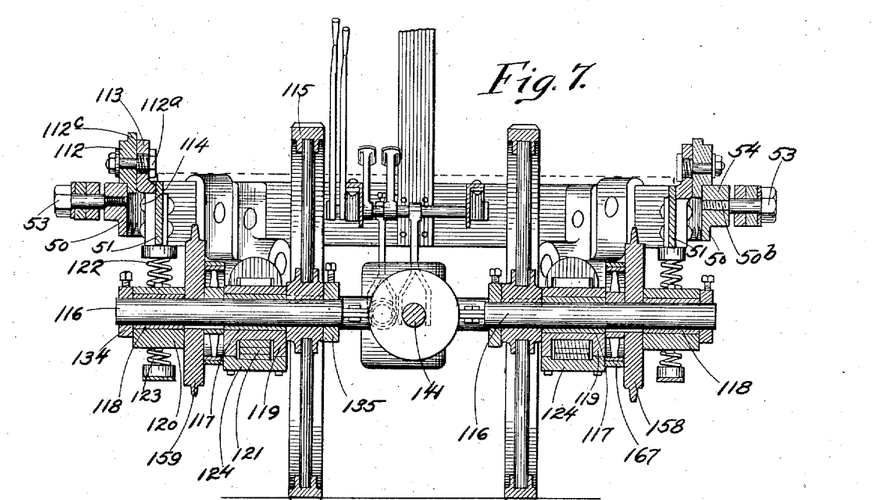
Fig. 7 is a cross section of the machine along the axis of the driving wheels.

In order to prevent the polygonal frame 51 and the outer frame 50 becoming separated, I provide rollers 112, which bear upon the upper edge of the circular frame 50 and which are secured to the polygonal frame by screws or pins 112ᵃ (Fig. 7). These screws or pins are threaded into upwardly projecting brackets 113 which are secured to the polygonal frame by suitable screws or rivets 114. The rollers 112 are preferably flanged, as shown at 112ᶜ, and by this means they assist in keeping the polygonal frame 51 in a central position within the frame 50.

The driving wheels 115 are in my invention placed at the front end of the machine and are secured to axles 116 which are fitted to bearings 117 and 118. These bearings are attached to the polygonal frame 51 by springs and other attachments as described later. Each of the drive wheels 115 is provided with a separate axle 116, these axles being capable of independent movements when the vehicle is moving in a curved path.

The bearings 117 are provided with means for holding the springs 121. The bearings 118 are adapted to act upon springs 123. The springs 121, of the semi-elliptic form, are secured to the lower portions of the blocks 119. The middle parts of the said springs 121 are secured in position in the blocks 119 by caps 124, suitable screws being provided for holding said caps in place.

It will be seen that the weight of the forward portion of the vehicle rests upon the two wheels 115 and that the upper reaction on said wheels causes an upward pressure to be exerted upon the bearings 117, and hence an upward pressure is transmitted to the middle portion of the semi-elliptic springs 121. At the outer ends of the axles, however, the bearings 118 would resist a pressure in the opposite direction to that acting upon the bearings 117, because of the fact that the bearings 117 act as fulcrums about which the upward reaction of the wheels 115 act as at the end of a lever arm, and the opposite end of the axle 116 is moved downwardly about said fulcrum. The downward pressure exerted by the outer end of the axle 116 is transmitted to the bearing 118 in the block 120 and finally to the springs 123.

The semi-elliptic springs 121 are fitted at their ends to cylindrical members 75 which have a bearing in the chairs or hangers 125, which are in turn secured to the polygonal frame 51. These spring connections have been previously described in connection with the springs 63 and 85. The ends of the springs are capable of a longitudinal movement in the slot 78 in the cylindrical member 75, and said member 75 is capable of a rotary motion. Hence the end of the spring is capable of a universal movement at its point of connection with the polygonal frame 51.

The chairs or hangers 125 are preferably provided with lugs 127 and 128 which fit over the edges of the polygonal frame 51, and screws or bolts 129 are passed through the upwardly disposed portion 126 of the body of the hanger and through the frame 51.

The bearing blocks 120 are provided with laterally projecting arms 130 which are fitted to vertical guides 131 attached to the polygonal frame 51. These guides 131 serve to support spring seats 132 in which the springs 123 are placed. The downward pressure of the outer ends of the axles 116 is therefore resisted by these springs. I preferably place other springs 122 above the arms 130. These springs are provided with seats 133 at their upper end which are secured to the said frame 51. The springs 122 are intended to serve as cushions against sudden upward movements of the outer ends of the axles. These springs 122 and 123 are preferably helical springs. The pressure acting upon them is relatively light and much less than that acting upon the springs 121, because of the effect due to the lever action in the axles 116. The bearing blocks 120 are held in place upon the axle 116 by a collar 134, and the driving wheel 115 is held in place by another collar 135. The driving power of each of the wheels 115 is transmitted to the polygonal frame 51 by a push rod 136 which is pivotally attached to the bearing block 119 at its rear end by the pin 137 and to the part 104 on the said frame by the pin 138.

The motor 140 is carried by the polygonal frame 51 and is preferably a gasolene motor of the usual type, though any motor suitable for the purpose may be used. The shaft 141 of this motor may carry a clutch 142 and this clutch in turn may connect with a shaft 143. A speed gearing box 144 is provided, and the gearing in said box connects with a shaft 145 in the manner commonly known in mechanism now used for that purpose. The shaft 145 is connected with differential gearing which is inclosed in the casing 146. The differential gearing is connected with two shafts 147 and 148 having bearings 149 and 150 secured to the polygonal frame 51 by flanges 151 and 152 and suitable rivets.

The differential gearing inclosed in the casing 146 is provided for the purpose of driving the two shafts 147 and 148 at different speeds, but with the same driving force while the machine is moving in a curved path. This mechanism is very commonly used in motor vehicles and other machinery, and a detailed description of it as well as of the speed gearing in the casing 144 and of the clutch 142 are not here given, as the details of these parts form no part of the present invention.

At the outer extremities of the shafts 147 and 148 are fixedly mounted sprocket wheels 154 and 155 to which are attached the sprocket chains 156 and 157 leading to larger sprocket wheels 158 and 159 which are secured to the axles 116. The sprocket chains 156 and 157 transmit the motion of the shafts 147 and 148 to the said axles, and therefore the motor 140 is thereby enabled to propel the machine.

A hand lever 160 is provided for operating the speed gearing in the casing 144 in a manner commonly known. Treadles 161 permit the operator to manipulate the clutch 142 and the brake. A lever 162 is also connected to the brake in the usual manner. The shaft 163 is provided for transmitting the motion of the lever 162 to the brake, and said shaft is supported in bearings 165 attached to the polygonal frame. At extremities of the said shaft are small crank arms 164 which are pivotally attached to links 166, which are in turn connected with a band or friction brakes 167 attached to the axles 116. The motor 140 is preferably supported by the frame members 168 which extend from the front edge of the polygonal frame 51 to its rear edge and are secured thereto.

The steering mechanism comprises a gear 169, which meshes with teeth upon the lower edge of the circular frame 50 and which is supported in bearings upon the polygonal frame 51. By providing suitable mechanism for rotating the gear 169, I am enabled to steer the machine. When the said gear 169 is rotated it is caused to move in a circular direction beneath the frame 50, and hence the polygonal frame 51 and drive wheels 115 which are mounted therein are moved to the angular position desired relative to said frame 50. This angular position causes the machine to travel in a curved path. The gear 169 is driven by power derived from the motor 140 through mechanism which is under control of the operator. This mechanism is controlled by a hand wheel 170, which is suitably mounted in front of the seat which the operator occupies upon the rear portion of the polygonal frame 51. The hand wheel 170 is fixed to a vertical steering shaft 171 which is inclosed in a tube 171$^a$, said tube being held by a base 171$^b$ secured to the platform 107. The steering shaft 171 is provided with a short lever or arm 172 fixed to its lower end, and is pivotally attached to two links 173 and 174 which extend laterally in opposite directions therefrom. These links are pivotally attached to levers 174$^a$ and 175 which are pivoted at 176 and 177 to the platform 107. The forward ends of these levers are pivotally and non-rotatably attached to the clutch members 178 and 179, which are slidably, but non-rotatably, mounted upon the shaft 182 by means of feathers 180 and 181. The clutch members 178 and 179 are adapted to engage and drive other clutch members or driven members 183 and 184 which are rotatably mounted upon the shaft 182. These driven members 183 and 184 form the bodies of beveled gear wheels which mesh with another gear wheel 198, which drives the steering mechanism which will be described later.

The two gear wheels 183 and 184, being engaged with the gear 198 upon opposite sides thereof are adapted to drive the said gear 198 in either direction, depending upon which one of them is drivably connected with the shaft 182. This connection is made by means of the clutches 178 and 179, either of which may be put into engagement with its respective gear 183 or 184. The clutch members 178 and 179 are rotatively driven by the shaft 182, which in turn is driven by the bevel gear 185 which is secured on said shaft by a key 185$^a$. The gear 185 meshes with and is driven by a gear 186 which is secured to the shaft 187 by the key 186$^a$. The shaft 187 carries a sprocket wheel 188 which is secured thereto and which is connected with another sprocket wheel 189 fixed to the motor shaft 141. A sprocket chain 190 connects the two sprocket wheels and enables the shaft 141 to drive the shaft 187. The shaft 187 is supported in bearings 191 and 192 which are carried by the frame member 193 which is secured to the frame members 168. This frame member 193 has forwardly projecting arms 194 and 195 which have bearings 196 and 197 at their extremities and which support the shaft 182. It will now be seen that the motor 140 is operatively connected with the shaft 182 and may be connected with the gear 198 through either of the clutch members 178 and 179 and gears 183 and 184.

The gear 198 is fixed to the upper end of the vertical shaft 199 which is provided with bearings 200 and 201 in a frame member 202 which is secured by rivets at 203 to the polygonal frame 51. A screw or worm 204 is fixed to the shaft 199 and meshes with and drives a worm wheel 205, which is secured to a shaft 206. This shaft 206 is provided with bearings 207 and 208 in the frame member 209 which is secured to the polygonal frame 51 by the rivets or bolts 210. The gear wheel 169, previously mentioned, is secured to the shaft 206, and when said gear wheel 169 is rotated, the polygonal frame 51 is moved in a horizontal direction within the frame 50.

The seat 211 is provided for the operator and is secured to the polygonal frame 51 by means of a bar 212. A cab 215 is placed over the forward end of the machine and is supported upon the platform 107 by upright posts 213 and 214. This cab may be supported by four posts 213 and 214 on either side of the operator's seat, or the posts may be placed farther apart if preferable on the outer part of the platform by means of the posts 215$^a$ and 216, whose positions are indicated by dotted lines in Fig. 2. A railing 217 may be provided about the platform 107, and is preferably supported by posts 218 which are secured at their lower ends to the outer frame 50. It will be seen that the platform, the cab, the operator's seat, &c., are free to revolve within the frame 50. It will be further seen that the motor 140, the drive wheels 115, and all the driving and steering mechanism partake of the rotary movement of the polygonal frame 51 within the outer frame 50.

I have preferred to illustrate in connection with my invention the group of agricultural implements comprising a series of plows 219, a harrow 220, and a seed-drill 218. A frame 221 for carrying these implements is suspended at the lower ends of upright rods 222, which are attached to eccentric straps 223 and 224 which are fitted to eccentrics 225 and 226. These eccentrics are secured to shafts 227 and 227a, which have suitable bearings in standards 243 and 243a which rise from a framework 88. This framework 88, as previously described, is adapted to be removably attached to the carrying frame 79 of my improved main frame by the bolts 89.

The shafts 227 and 227a carry sprocket wheels 228 and 229 which are secured to said shafts, said sprocket wheels being operatively connected by a sprocket chain 228a. One of the sprocket wheels 229 is driven by the sprocket chain 230 which is attached to the sprocket wheel 231 fixed upon a shaft 232. The shaft 232 is carried by a lever 234, Figs. 3 and 24, which is pivoted at 235 to a hanger or frame member 236. This frame member 236 is secured to the framework 88.

The shaft 232 carries rollers 233 which are secured to said shaft and which are adapted to be placed in frictional contact with the periphery of the wheels 60. The levers 234 are adapted to cause this frictional engagement through means of a flexible member 238 which is led forward to the cab and enters the same through an aperture 239 in the top thereof. A ring 240 is attached to the end of the flexible members or cord 238 and hangs within convenient reach of the operator. The aperture 239 is axially coincident with the platform 107 and polygonal frame 51. The spring 237 draws back the lever 234 and moves the rollers 233 when the cord is released by the operator from the wheels 60. By means of this lever and cord the operator is enabled to bring about a rotation of the shaft 232, and hence of the shafts 227 and 227a, to rotate the eccentrics and raise the frame 221, together with the agricultural implements which are attached thereto.

In order to hold the implements in an elevated position while they are being moved from place to place and are doing no work, a curved or arched frictional rod 241 is provided for making a frictional contact with the eccentric straps 223 and 224, when in their uppermost position. This frictional device 241 is supported by an upright frame member 242 which is suitably secured to the standards 243. The rods 222 are pivotally attached at 222a to the frame 221, in order to permit a small oscillating movement of said rods due to the rotary movement of the eccentrics 225. In order to prevent a backward swinging movement of the frame 221, and to transmit the tractive force of the vehicle to the agricultural implements attached to said frame I provide the chains or flexible members 244, which are attached to said frame by means of hooks 245. The forward ends are suitably attached to the bars 55 of the outer circular frame 50. These bars may be connected by stays 247 with the circular frame 50 to more efficiently transmit the stress.

The operation of my invention has already been referred to in the preceding detailed description. The following brief outline of its general mode of use will be added.

The operator or driver occupies the seat 211, with the steering wheel 170 before him. The levers 160 and 162 are within convenient reach for varying the speed of the vehicle and for applying the brake. The treadles 161 are also within reach of the operator's feet and enable him to control the clutch and also to control the brake. These levers and treadles are substantially the same as those commonly used in motor vehicles at the present time, and further reference to them is not thought necessary.

The steering mechanism is operated by means of the hand wheel 170 previously described. This hand wheel may be made to cause either of the clutches 178 or 179 to become engaged with either of the gears 183 or 184. The gears 183 and 184 being constantly in mesh with the gear 198, the particular one engaged by its clutch will be caused to drive the said gear 198. The said clutch is driven, through mechanism previously described, by the motor 140. The gear 198 is connected through mechanism previously described, comprising the worm gearing, with a gear pinion 169. This gear pinion 169 meshes with the gear teeth upon the lower edge of the outer circular frame 50. It will be seen that the operator may control the direction of rotation of the gear 169. It will therefore be seen that by rotating the hand wheel 170 in either direction the operator may cause the power derived from the motor 140 to drive the gear pinion 169 in either direction at will. It is therefore clear that the inner polygonal frame 51, upon which the platform and all of the driving and steering mechanism is mounted, may be rotated horizontally in either direction, and the vehicle thereby caused to move to the right or to the left, as may be desired.

A particular advantage of the above described steering mechanism consists in the small radius in which the vehicle may be turned. It is in fact possible to turn the vehicle within a radius equal to the length of the vehicle. Another important advantage lies in the fact that the power of the motor is used to drive the steering mechanism, thereby relieving the operator of this labor. The control of the mechanism only is left to the operator and this requires but little manual effort on his part.

An important advantage of my improved construction is the extreme flexibility of the framework whereby it easily operates upon very rough ground without becoming strained or damaged. The rear wheels 60 are seen to be supported in forked members 52, which are pivotally attached to the circular frame 50 at the points 53. By this construction the said members 52 and the wheels thereto attached are enabled to rise in a vertical direction a very considerable distance without interfering with the position or movements of the circular frame 50 or the front portion of the machine. While this vertical movement of the members 52 and wheels 60 takes place a very substantial connection with the remainder of the framework is maintained. This connection comprises slides 56 which act as a guide for the vertical movements of the members 52. The members 52 are also slidably and rotatably attached to the transverse spring 63, the said spring being pivotally attached at its center to the circular frame 50. It will be seen that the said spring may have a considerable angular movement in a vertical direction while maintaining its connection with the said members 52. It will further be seen that the spring 63 serves as an equalizing or distributing means for transmitting the stresses from one part of the whole vehicle to the other parts. Another important feature of flexibility consists in the manner in which the implement carrying frame 79 is suspended from the main frame. This implement frame is free in a large measure to swing from side to side, its point of suspension at its forward end being a considerable distance above its main body. The rear end of this vehicle carrying frame 79 is supported by another transverse spring 85 which has a slidable and rotatable connection with the forked members 52, and hence a more or less universal movement is thereby permitted. This same implement supporting frame 79 may be used for carriage bodies for passengers by the simple removal and insertion of bolts or other fastening devices 89, 91, etc. This frame 79 may also be used for supporting a plain body or box for the carrying of merchandise, which body may be similarly attached by means of bolts 91b. The series of plows 219, the harrow 220, and the lower seed-drill parts 220a may be quickly raised or lowered by the operator by means of the cord 238 with the ring 240 at its end. This cord 238 causes the lever 234 to press the roller 233 into contact with the driving wheel 60. The other mechanism previously described causes the eccentrics 225 and 226 to rotate and to raise or lower the frame 221.

While I have described my invention more or less precisely with regard to the details of construction and arrangement, I do not wish to be limited thereto, as I contemplate changes in the construction, the form and proportion of parts, and the substitution of equivalents, as circumstances may suggest or render expedient, without departing from the spirit of my invention.

I claim:

1. In a motor vehicle, a primary frame, rearward extensions pivotally attached to said primary frame, wheels attached to said extensions, a resilient member pivotally attached to said primary frame and having connections with said extensions that permit a vertical movement thereof against the resistance of said resilient member, and a secondary frame axially disposed with relation to said primary frame and adapted to rotate with relation thereto whereby the vehicle may be steered.

2. In a motor vehicle, a primary frame, rearward extensions pivotally attached to said primary frame, wheels attached to said rearward extensions, a resilient member pivotally attached to said primary frame and having connections with said extensions that permit a vertical movement thereof against the resistance of said resilient member, means attached to said primary frame for guiding and constraining the movement of said extensions in a vertical direction, and a secondary frame axially disposed with relation to said primary frame and adapted to rotate with relation thereto whereby the vehicle may be steered.

3. In a motor vehicle, a primary frame, rearward extensions pivotally attached to said primary frame, and having forked rear ends adapted to hold the axles of wheels lying between the forked ends of said extensions, wheels attached to said rearward extensions, a resilient member pivotally attached to said primary frame and having connections with said extensions adjacent said primary frame that permit a vertical movement thereof against the resistance of said resilient member, means attached to said primary frame for guiding and constraining the movement of said extensions in a vertical direction, and a secondary frame axially disposed with relation to said primary frame and adapted to rotate with relation thereto whereby the vehicle may be steered.

4. In a motor vehicle, a primary frame, rearward extensions pivotally attached to said primary frame, wheels attached to said extensions, a depending frame pivotally attached to said primary frame at its forward end and supported by said extensions at its rear end, and a secondary frame adapted to rotate with relation to said primary frame whereby the vehicle may be steered.

5. In a motor vehicle, a primary frame, rearward extensions pivotally attached to said primary frame, wheels attached to said extensions, a depending frame pivotally attached to said primary frame at its forward end and supported by said extensions at its rear end, and resilient means attached to said primary frame and having connections with said extensions that permit vertical movements thereof against the resistance of said resilient means.

6. In a motor vehicle, a primary frame, rearward extensions pivotally attached to said primary frame, wheels attached to said extensions, a depending frame pivotally attached to said primary frame at its forward end and supported by said extensions at its rear end, resilient means attached to said primary frame and having connections with said extensions that permit vertical movements thereof against the resistance of said resilient means, and a secondary frame adapted to rotate with relation to said primary frame whereby the vehicle may be steered.

7. In a motor vehicle, a primary frame, rearward extensions pivotally attached to said primary frame, wheels attached to said extensions, a depending frame pivotally attached to said primary frame at its forward end and supported by said extensions at its rear end, resilient means attached to said primary frame and having connections with said extensions that permit vertical movements thereof against the resistance of said resilient means, and resilient means attached to said depending frame adjacent its rear end and having connections with said rearward extensions that permit vertical movements thereof against said resilient means.

8. In a motor vehicle, a primary frame, rearward extensions pivotally attached to said primary frame, wheels attached to said extensions, a depending frame pivotally attached to said primary frame at its forward end and supported by said extensions at its rear end, resilient means attached to said primary frame and having connections with said extensions that permit vertical movements thereof against the resistance of said resilient means, resilient means attached to said depending frame adjacent its rear end and having connections with said rearward extensions that permit vertical movements thereof against said resilient means, and a secondary frame adapted to rotate with relation to said primary frame whereby the vehicle may be steered.

9. In a motor vehicle, a primary frame, rearward extensions pivotally attached to said primary frame, wheels attached to said extensions, and a depending frame pivotally attached to said primary frame at its forward end and supported by said extensions at its rear end, and adapted to support and hold vehicle bodies or implement frames which may be removably attached to said depending frame.

10. In a motor vehicle, a primary frame, means for propelling and steering said primary frame, a plurality of rearward extensions pivotally attached to said primary frame, resilient means for resisting the pivotal movement of said extensions, and a body supporting frame pivotally attached at one end to said primary frame and supported at the other end by said rearward extensions.

11. In a motor vehicle, a primary frame, means for propelling and steering said primary frame, a plurality of rearward extensions pivotally attached to said primary frame, resilient means for resisting the pivotal movement of said extensions, and a body supporting frame pivotally attached at one end to said primary frame and independently supported at the other end by each of said rearward extensions.

12. In a motor vehicle a primary frame, means for propelling and steering said primary frame, a plurality of rearward extensions pivotally attached to said primary frame, resilient means for resisting the pivotal movement of said extensions, a body supporting frame pivotally attached at one end to said primary frame and independently supported at the other end by each of said rearward extension, and resilient connections between said body supporting frame and said rearward extensions adjacent said other end.

13. In a motor vehicle, a primary frame, rearward extensions pivotally attached to said primary frame, wheels attached to said extensions, a depending frame pivotally attached to said primary frame at its forward end and supported by said extensions at its rear end, a secondary frame adapted to rotate with relation to said primary frame whereby the vehicle may be steered, a motor carried by said secondary frame, and steering mechanism carried by said secondary frame and geared to said motor.

14. In a motor vehicle, a primary frame, rearward extensions pivotally attached to said primary frame, wheels attached to said extensions, a depending frame pivotally attached to said primary frame at its forward end and supported by said extensions at its rear end, resilient means attached to said primary frame and having connections with said extensions that permit vertical movements thereof against the resistance of said resilient means, a secondary frame adapted to rotate with relation to said primary frame, a motor carried by said secondary frame, and steering mechanism carried by said secondary frame and geared to said motor.

15. In a motor vehicle, a primary frame, rearward extensions pivotally attached to said primary frame, wheels attached to said extensions, a depending frame pivotally attached to said primary frame at its forward end and supported by said extensions at its rear end, resilient means attached to said primary frame and having connections with said extensions that permit vertical movements thereof against the resistance of said resilient means, a secondary frame adapted to rotate with relation to said primary frame whereby the vehicle may be steered, a motor carried by said secondary frame, and steering mechanism carried by said secondary frame and geared to said motor.

16. In a motor vehicle, a primary frame, a secondary frame, means carried by said secondary frame for propelling and steering said primary frame, a plurality of rearward extensions pivotally attached to said primary frame, resilient means for resisting the pivotal movement of said extensions, and a body supporting frame pivotally attached at one end to said primary frame and supported at the other end by said rearward extensions.

17. In a motor-vehicle, a primary frame, a secondary frame, means carried by said secondary frame for propelling and steering said primary frame, a plurality of rearward extensions pivotally attached to said primary frame, resilient means for resisting the pivotal movement of said extensions, and a body supporting frame pivotally attached at one end to said primary frame and independently supported at the other end by each of said rearward extensions.

18. In a motor vehicle, a primary frame, a secondary frame, means carried by said secondary frame for propelling and steering said primary frame, a plurality of rearward extensions pivotally attached to said primary frame, resilient means for resisting the pivotal movement of said extensions, a body supporting frame pivotally attached at one end to said primary frame and independently supported at the other end by each of said rearward extensions, and resilient connections between said body supporting frame and said rearward extensions adjacent said other end.

In testimony whereof, I have subscribed my name.

THOMAS J. THORP.

Witnesses:
C. W. WESTOVER,
FRED D. HOYT.

Copies of this patent may be obtained for five cents each, by addressing the "Commissioner of Patents, Washington, D. C."